Figure 1:
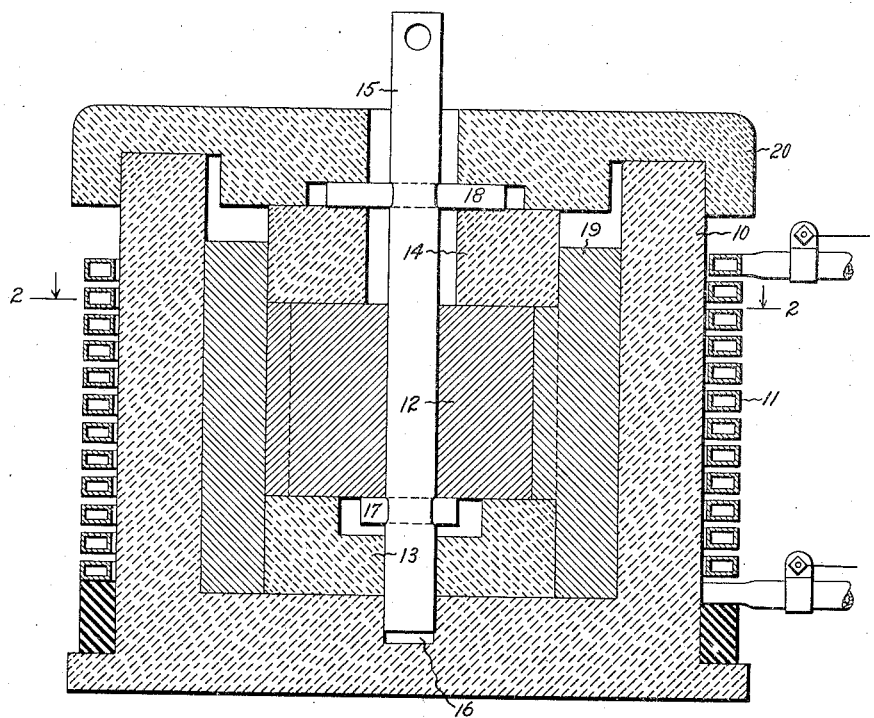

Dec. 6, 1938.   N. R. STANSEL   2,139,528
ELECTRIC INDUCTION FURNACE
Filed Sept. 17, 1936

Inventor:
Numan R. Stansel,
by Harry E. Dunham
His Attorney.

Patented Dec. 6, 1938

2,139,528

UNITED STATES PATENT OFFICE 2,139,528

ELECTRIC INDUCTION FURNACE

Numan R. Stansel, Schenectady, N. Y., assignor to General Electric Company, a corporation of New York Application September 17, 1936, Serial No. 101,284

3 Claims. (Cl. 13—27)

My invention relates to electric induction furnaces, and has for its object a simple and reliable furnace for heating the surface layers of objects, for example, for surface hardening purposes.

My invention is particularly useful in the hardening of the wearing surfaces of machine parts, such as steel gear teeth. In order to increase the life of gears, it has been proposed to harden a thin outer layer of the metal on the wearing surface of the teeth, but without hardening the remaining body portion of the gear. It is important that the body of the gear and the inner portions of the teeth shall not be hardened or heated to hardening temperatures because of the impairment of their strength and other physical properties caused by such hardening or heating. Even though the hardening of the gear when uniformly heated and quenched is largely confined to outer zones, its internal structure is changed with resulting undesirable properties. In other words, a thin layer forming the wearing surface only of the teeth should be hardened to greatly prolong the life of the gear while the tough, shock absorbing properties of the gear are retained.

Uniformly shaped objects, for example, shafts, may be conveniently heated for surface hardening by high frequency coreless inductive heating means, it being a characteristic of this heating means that the heat generation is confined to an outer layer which may be heated to a hardening temperature before the interior of the article is heated to a hardening temperature. The thickness of the heated outer layer which is hardened may be varied as desired by changing the frequency, the thickness of the heated layer decreasing when the frequency is increased. However, this simple form of heating means is not adaptable to the heating of a portion of the surface only, nor to the heating of surface layers of irregular shape. In heating gear wheels, for example, the heat generation would not be confined uniformly to the surface layers of the teeth and, in fact, it is probable that each tooth would be heated in its entirety or the more intense heating localized in the base of each tooth.

In accordance with my invention, I provide heating means for supplying heat rapidly and uniformly to the surface or portion of the surface of the object to be hardened, whereby a layer of metal adjacent this surface, the thickness of which varies with the heating period, is heated to the required hardening temperature or above before the remaining portion of the object has reached that temperature. More specifically, I provide a bath of molten metal having a low melting point, preferably lead, which is in direct contact only with the surface to be heated, the bath of lead being in turn heated by means of a high frequency primary winding surrounding the bath. The molten lead is heated very quickly to a high temperature, such as 1300° C., and because of the vigorous stirring of the molten lead by electrodynamic action, the heat is transferred by forced convection very rapidly from the lead to the surface of the object. An additional function of the lead bath is that it serves as a magnetic shield to prevent inductive heating of the interior of the article, the generation of heat being thereby confined to the lead bath.

Figure 2:
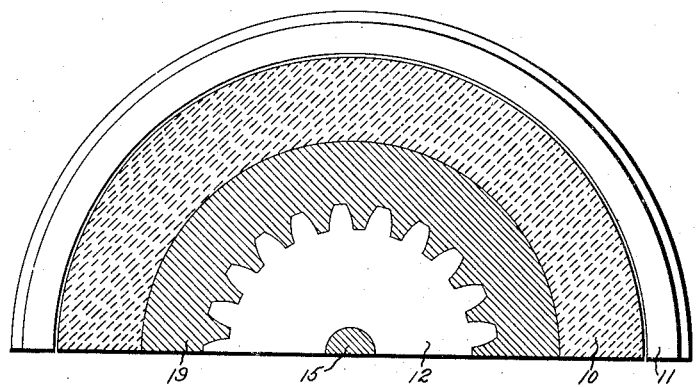

For a more complete understanding of my invention, reference should be had to the accompanying drawing, Fig. 1 of which is a vertical sectional view of an induction furnace embodying my invention, while Fig. 2 is a fragmentary sectional view of Fig. 1 along the line 2—2 and looking in the direction of the arrows.

Referring to the drawing, my invention in one form comprises a cylindrical crucible 10 made of a suitable heat refractory electrically insulating material, such as glazed stoneware, which is surrounded by a primary inducing winding 11. As shown the winding 11 is preferably made from a hollow conductor through which water may be circulated for cooling purposes. The object to be hardened, shown as a gear 12, is placed in this crucible on a disk 13 of heat refractory material having a diameter equal to the overall diameter of the gear at the outer ends of its teeth. A second heat refractory disk 14 having the same diameter as the disk 13 is placed on the gear, the gear being approximately centered in the crucible 10 by means of a dummy shaft or rod 15 extending through the bore of the gear and the central aperture in the disk 13, the lower end of the rod extending into a circular recess 16 centrally located in the bottom of the crucible. As shown, the gear and the disk 14 are secured on the rod by means of pins 17 and 18 extending through suitable holes in the rod whereby the gear and the disk 14 may be inserted in the crucible and removed therefrom by means of the rod 15.

As thus arranged, it will be observed that the gear is centrally located in the crucible and is entirely enclosed except for the wearing surfaces of its teeth. For the purpose of heating the gear, the annular space surrounding the gear between it and the wall of the crucible is filled with a quantity of a suitable metal having a low melting temperature as compared with that of the gear. This molten metal is in direct thermal relation with the wearing surfaces of the gear teeth. Preferably I use lead as the metal 19. The lead 19 is preferably introduced in a molten condition in the crucible after the gear has been placed therein as just described although, if desired, the lead may be unmelted and in the form of small pieces which are thereafter melted. A suitable heat refractory cover 20 is provided for the crucible.

The next step in the heating of the gear is the connection of the primary winding 11 to an alternating current supply source of suitable voltage and frequency whereby heating currents are induced in the annular layer of lead 19 of sufficient magnitude to heat the lead rapidly to a temperature, such as 1300° C., which is well above the required hardening temperature.

An important feature of my invention which further distinguishes it from the conventional lead bath hardening furnace is the vigorous stirring of the lead by electro-dynamic action whereby heat is transferred from the lead with the greatest possible rapidity. This stirring action for a given frequency is practically proportional to the square of the ampere turns of the primary coil and to the input of power to the charge, and inversely proportional to the density of the metal. Thus, by reason of the stirring action the temperature of the lead is maintained uniform and the surface being heated is at all times subjected to that temperature, the temperature decreasing rapidly from the surface into the interior of the gear. This steep temperature gradient assures the heating of an outer layer to the hardening temperature before the interior of the gear is heated to that temperature. The hardening temperature, approximately 900 C. will vary somewhat with the properties of the steel of the gear, the increase in temperature above this minimum at the surface, for example, to 1300° C., not being objectionable.

Obviously, the thickness of the hardened surface layer depends directly upon the duration of the heating period. The heating operation will be continued for a time, such as a few minutes, as previously determined by tests to give the desired thickness of the surface hardening. The gear is then removed and quenched immediately. It is contemplated a hardened surface layer of from $\tfrac{1}{16}$ to $\tfrac{1}{32}$ of an inch will be provided, although the thickness can obviously be varied as desired by correspondingly changing the heating period.

Preferably, the lead will be emptied from the furnace after each heating operation in order to facilitate the placing of another object in the furnace. It is contemplated that an auxiliary electric furnace will be provided for maintaining the lead molten, and the lead may be drained off through an opening (not shown) in the bottom of the hardening furnace into the auxiliary pre-heating furnace and transferred by suitable pumping means back to the hardening furnace when needed. Furthermore, the lead if desired, may be heated in the auxiliary furnace to the maximum temperature, such as 1300° C., the hardening furnace then serving to maintain this temperature and stir the lead to effect the greatest possible rate of heat transfer to the gear. With lead, the maximum temperature is of course limited by the boiling or vaporization point of the lead.

For the purpose of facilitating the control of the lead temperature a suitable temperature indicator is provided, for example, a thermocouple, (not shown) immersed in the lead, the heating circuit of the primary winding being controlled either manually or automatically by the thermocouple to prevent overheating of the lead, and maintain its temperature approximately at the predetermined maximum. Also, the furnace may be so proportioned and designed as to its electrical characteristics that the lead will not be overheated during the relatively short heating period.

The annular layer of molten metal 19 also serves as a magnetic shield whereby the magnetic flux generated by the primary winding 11 is excluded from the interior of the annular body of metal 19 and therefore from the gear. As a consequence, no heat is generated in the gear itself. The thickness of the annular layer of metal 19, i. e. its thickness in a radial direction, should be two or three times the equivalent depth of penetration of uniform magnetization, expressed by Steinmetz (Theory and Calculation of Transient Electrical Phenomena and Oscillations, 3rd edition, 1920, p. 371) as follows:

$$P = \frac{3570\sqrt{p}}{\sqrt{f\mu}}$$

wherein P=equivalent depth of penetration, centimeters; $p$=resistivity of charge, ohms cm³; $f$=frequency, cycles per second; $\mu$=permeability of the heat generating bath=1 for lead. Furthermore, this thickness must be great enough to provide for the required free circulation of molten metal, but for the lower high frequencies, below 1000 cycles, three times the equivalent depth of penetration will be satisfactory. Preferably a frequency of from 500 to 1000 cycles will be used.

For the purpose of securing the necessary violent circulation of the molten lead across the surface of the object being heated, it is essential that the thickness of the annular layer of molten lead 19 be not greatly in excess of three times the equivalent depth of penetration at these low high frequencies, i. e. below 1,000 cycles per second. This is because the heating currents and, therefore, the electro-dynamic forces producing circulation are generated to a large extent in an outer region of the molten lead. Consequently, if this thickness of three times the equivalent depth of penetration is greatly exceeded the required vigorous stirring action will not be imparted to the lead in contact with the object being heated. In other words, if the radial thickness is too great, then the molten lead actually in contact with the object being heated not only does not have heat imparted rapidly to it, but it does not flow across the surface of the object rapidly enough to impart heat to the object at the desired high rate.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States, is:

1. An electric induction furnace for heating the surface of a metal object comprising a receptacle for a body of molten lead, means for supporting the object to be heated in a central position in said receptacle, said receptacle being of such size as to provide a space around said object for molten lead, and a primary winding surrounding said receptacle arranged to be energized with a current having a frequency up to 1,000 cycles per second for inducing heating currents in the molten lead, the thickness of said space in a direction radial of said primary winding being substantially three times the equivalent depth of magnetic penetration whereby the lead acts as a magnetic shield to exclude from the object the magnetic flux set up by said winding and whereby a vigorous flow of the molten lead by electro-dynamic action is produced across the surface of the object to effect a rapid transfer of heat to the surface of the object.

2. An electric induction furnace for heating the surface of a metal object comprising a crucible, heat refractory means for supporting an object to be heated in said crucible, a heat refractory member covering the top of said object, said crucible being of such size as to provide a space around said object and said heat refractory members, a primary winding surrounding said crucible arranged to be energized with a current having a frequency up to 1,000 cycles per second for inducing electric heating currents in a body of molten lead in said space, said space having a thickness radial of said primary winding not substantially greater than three times the equivalent depth of magnetic penetration whereby magnetic flux from said primary winding is substantially excluded from the object being heated and the lead is heated rapidly and caused to flow vigorously by electro-dynamic action across the exposed surface of the object to transfer heat rapidly to the exposed surface of the object.

3. An electric induction furnace for heating gear teeth and the like for surface hardening purposes comprising a heat refractory crucible, a heat refractory member having substantially the same diameter as said gear for supporting said gear in a central position in said crucible with its axis of rotation vertical, a second heat refractory member on top of said gear, said crucible being of such size as to provide an annular space around said gear and said heat refractory members, and a primary winding surrounding said crucible arranged to be energized with a current having a frequency up to 1,000 cycles per second for inducing heating currents in a body of molten lead contained in said annular space, the thickness of said space in a direction radial of said primary winding being substantially three times the equivalent depth of magnetic penetration whereby the lead acts as a magnetic shield to exclude from the gear the magnetic flux set up by said winding and whereby a vigorous flow of the molten lead by electro-dynamic action is produced across the exposed surface of the gear to effect a rapid transfer of heat to the exposed surface of the gear.

NUMAN R. STANSEL.